W. C. BROWN.
WEED ATTACHMENT FOR FISHING BAIT.
APPLICATION FILED SEPT. 11, 1918.
1,419,540.
Patented June 13, 1922.
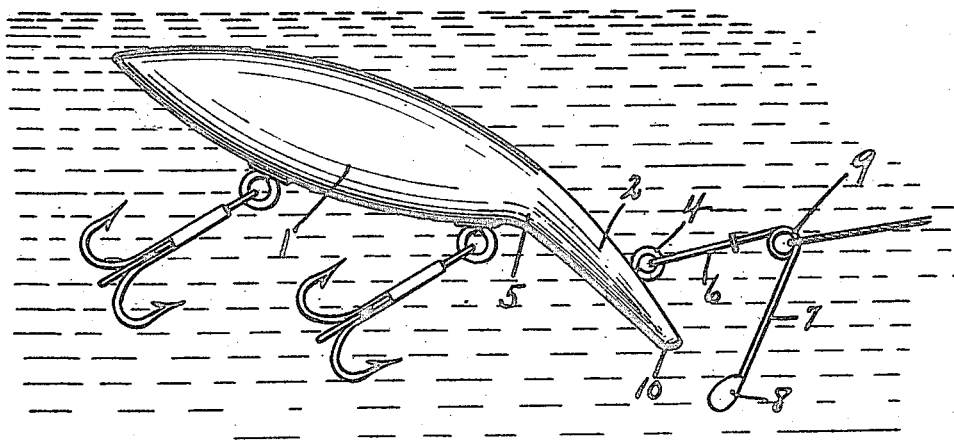
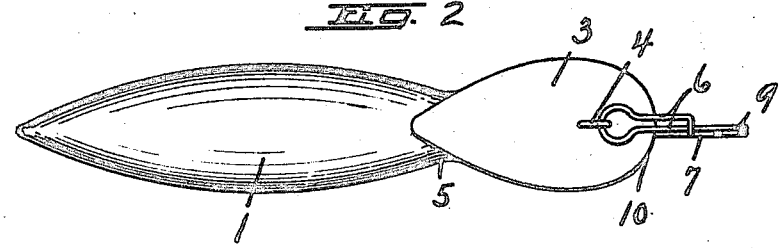
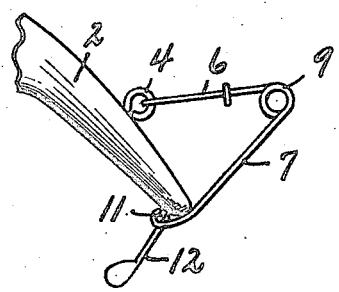
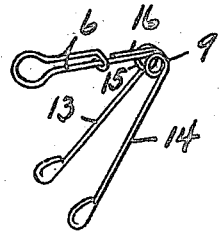
INVENTOR
William C Brown
BY
Howard P Denison
ATTORNEY

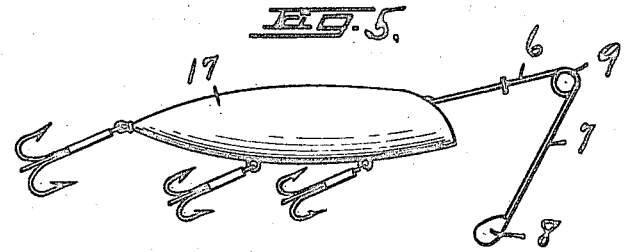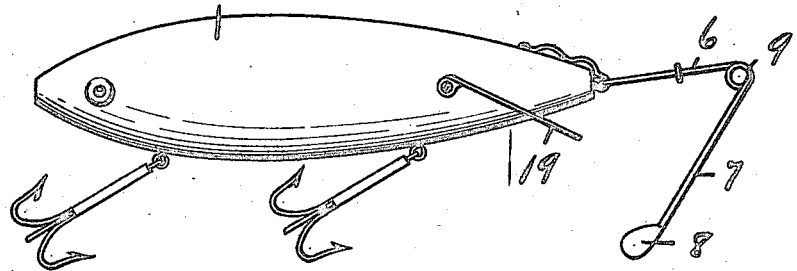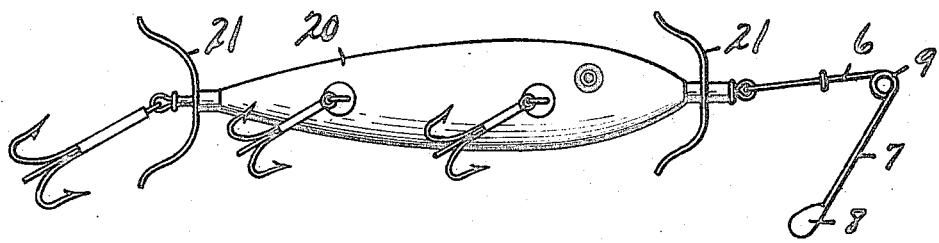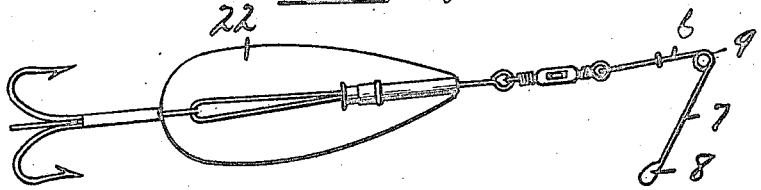

UNITED STATES PATENT OFFICE.

WILLIAM C. BROWN, OF SYRACUSE, NEW YORK, ASSIGNOR TO JOSEPH K. RUSH, OF SYRACUSE, NEW YORK.

WEED ATTACHMENT FOR FISHING BAIT.

1,419,540.     Specification of Letters Patent.     Patented June 13, 1922.

Application filed September 11, 1918. Serial No. 253,575.

*To all whom it may concern:*

Be it known that I, WILLIAM C. BROWN, a citizen of the United States of America, and resident of Syracuse, in the county of Onondaga, in the State of New York, have invented new and useful Improvements in Weed Attachments for Fishing Baits, of which the following, taken in connection with the accompanying drawings, is a full, clear, and exact description.

This invention relates to certain improvements in bait and devices applicable to the same and specifically pertains to an attachment adapted to prevent the collection of weeds, grass and other foreign, fibrous matter upon the bait and the device is particularly designed and adapted for application to diving, swimming bait of the type shown in Well's Patent 1,101,223 and the commercial embodiment thereof illustrated in Yakeley's Design Patent No. 46,704.

It is well known that diving, swimming bait of the type described cannot successfully be used in waters containing weeds grass and other vegetable life because of the fact that the vegetable matter collects upon the nose of the bait and at times upon the hooks destroying the swimming operation of the bait rendering it useless as a fish catcher.

The primary object therefore of this invention is to produce a device for attachment to bait, particularly of the type described, which will obviate this accumulation of vegetable matter and permit the operation of the bait in places and under conditions where it has heretofore been inoperable.

Further it has been found that bait equipped with the device of this application primarily produced for the purpose previously described has an improved swimming motion due perhaps to the fact that the device or attachment forms a portion of the means for securing the line to the bait and the further fact that as shown the device embodies a free end, in this instance a weighted end, which is secured to the bait in a more or less flexible manner, which seems to create a wobbling tendency in the bait additional to the swimming action typical of this type of bait.

Further, the attachment prevents the bait from catching upon snags, driftwood, logs, rocks and other obstructions, the free end of the attachment coming in contact with such substances will throw the bait upwardly to avoid the substance, thereby permitting the entire structure to be drawn over the obstacle.

The attachment further provides an ideal place to weight the bait. Weights and sinkers as usually placed upon the draft line constitute weed catchers and decrease if they do not altogether eliminate the vibration of the line caused by the swimming motion of the bait when acting properly. By placing the weight upon the lower free end of the attachment the telltale vibrator of the line is not interfered with and the action of the bait is improved.

Further, as specific natures of the attachment the loop for securement to the line eye is so constructed as to permit ready and easy attachment to the line eye, and equally rapid and easy detachment therefrom. Further, the attachment affords an easy and efficient means for attaching a line to a bait.

Other objects and advantages relate to the details of construction of the device as will more fully appear from the following detailed description taken in connection with the accompanying drawings in which—

Figure —1— is a side elevation of a bait equipped with a device of this invention.

Figure —2— is a top plan view of the same.

Figure —3— is a view similar to Figure —1— of the head of the bait equipped with a slightly modified form of the device.

Figure —4— is a perspective view of a further modified form of device.

Figures 5, 6, 7, and 8 are views of the device of Figure —1— applied to different forms of bait.

The invention as shown in Figure —1— is illustrated in connection with a commercial bait known as the "Rush Tango minnow", consisting of an ellipsoidal body —1— having a head —2— extending forwardly therefrom and provided with a forwardly and downwardly inclined plane face —3— adapted to induce submergence of the bait when drawn through the water by draft means connected to the line eye —4—, secured upon the plane face —3— of the bait. In this particular embodiment of the Welles bait the ellipsoidal body and the head are separated by a contracted neck portion —5—. It will be understood, however, that a device of this invention is applicable to various forms of bait and particularly to all types of diving, swimming bait.

As shown in Figures —1—, —2— and —5— to —8— inclusive, the weed shield or attachment comprises a single piece of bendable wire having one end formed in a loop —6— for engagement with the eye —4— and its opposite end —7— extending at an angle thereto and terminating preferably in a weighted end —8—. This weight may be omitted when desired while retaining many of the valuable features of the invention. The end parts —6— and —7— are connected by an intermediate spiral loop or eye —9— constituting an eye for the securement of the line to the weed shield. In actual operation, the part 6—6 of the device constitutes a portion of the draft means of the bait while the end part —7— connected thereto by spring eye or loop —9— extends downwardly and rearwardly from the spring eye to a point below the nose —10— of the bait. When the bait is drawn through the water, it moves at an angle approximating the angular disposition of the bait as illustrated in Figure —1— and the hooks incline rearwardly from their attaching eyes to such an extent that they do not project materially below the nose —10— of the bait. The part —7— acts to deflect vegetable matter and other debris below the nose of the bait and below the hooks and prevents collection of the vegetable matter and foreign substances upon the bait. The efficiency of the construction is enhanced by reason of the spring nature of the support for the shield and the fact that its support forms a portion of the draft means. Further as heretofore stated, it operates to improve the swimming action of the bait.

It will be obvious from the above description that from the disclosure of the drawing herein, the guard member in all the instances shown, overlies the front end of the bait, and that the arm —7— is of sufficient length to underlie the bottom of the bait.

In Figure —3— I have shown a modified form of device in which the part —7— has an intermediate portion looped about an eye —11—, secured beneath the forward end —10— of the bait.

In this structure preferably the arm —7— is of sufficient length so that its free end —12— beyond the loop may extend downwardly a sufficient distance to deflect vegetable matter, weeds, etc., below the hooks.

In Figure —4— I have illustrated a further modified form of device in which the part —7— instead of being unitary in form is of a dual nature comprising downwardly extending preferably diverging parts —13— and —14—, one of which may be an integral extension of the part —6— and in this illustration, the part —14— is so shown while the part —13— is shown as provided with an intermediate eye —15— and a projecting end —16— soldered or otherwise secured to the part —6—. As before stated, baits of this type have not been particularly usable in waters containing grass, weeds, etc., as such substances would rapidly accumulate upon the nose of the bait and between the lower end —10— thereof and the draft means, as a line, and the draft eye —4—. The result was that the swimming operation of the bait was lost and its efficiency as a fish catcher destroyed. My invention obviates this defect of prior bait of this type and as heretofore stated increases the effective operation of the bait.

In Figures 5 to 8 inclusive, I have shown the device applied to various forms of bait, Figure —5— illustrating a bait consisting of an ellipsoidal body —17— having a forwardly and downwardly inclined concave plane at its front end.

Figure —6— illustrated a bait consisting of an ellipsoidal body —18— a metallic plate —19— secured adjacent the front end thereof and acting to induce submergence of the bait when drawn through the water.

Figure —7— illustrates a known form of bait comprising an ellipsoidal body —20— equipped with spinners —21—, showing the applicability of the device to bait other than the Welles type.

Figure —8— illustrates the applicability of the device to spoon bait, the spoon being shown at —22—.

Although I have shown and described specific structures as illustrative of a particular device for effecting the objects of my invention, I do not desire to limit myself to the same, as I believe that I am the first to provide a means for preventing the accumulation of weeds, vegetable matters, etc., upon bait and many and various changes may be made in the structural features of the device while attaining the advantages of my invention and all within the scope of the claims hereto appended.

What I claim is:

1. An artificial bait comprising a body, a fish hook secured to said body, a guard member comprising a pair of diverging parts having their adjacent ends connected, one of said parts having its free end formed with means for securement to the bait body, said part adapted to constitute a portion of the draft means for the bait and the other part adapted to deflect matter from contact with a portion of the front end of the bait.

2. An artificial bait comprising a body, a fish hook secured to said body, a guard member comprising a pair of diverging parts having their adjacent ends connected, one of said parts having its free end formed with means for securement to the bait body, said part adapted to constitute a portion of the draft means for the bait, and the other part extending downwardly and rearwardly forward of the front end of the bait and free to swing with reference to said front end.

3. In a device of the class described, two angularly disposed connected parts having an eye at the point of connection, one of said parts having its free end formed in a loop, the other one of said parts terminating in a weighted end.

4. A device of the character described, formed of a single piece of flexible material bent to form diverging parts connected by a spiral eye, one of said parts terminating in a part adapted for connection to a bait, and the other one of said parts terminating in a weighted end.

5. A device of the character described, comprising a pair of diverging connected parts having an eye adjacent the point of connection for receiving a draft line, one of said parts having its free end formed with means for securing the same to a bait, and the other of said parts being of a length to underlie the body of the bait.

6. An artificial bait comprising a body, a fish hook secured to said body, and a substantially V-shaped guard member having one end portion loosely engaged with the upper portion of the body adjacent the forward end thereof, the opposite end portion of the guard member being of a length to overlie the front end of the body, the end portions of the guard member being spaced apart a distance to permit swinging movement of the guard member with respect to the body without interference with the body, said guard member being provided at its apex portion with means for connection with the line.

7. An artificial bait comprising a body, an outstanding eye-member carried by the upper surface of the body adjacent the forward end thereof, a substantially V-shaped guard member having one end portion loosely engaged with the eye member, the opposite end portion of said guard member being of a length to partially underlie the body.

8. The combination with a bait having a forwardly downwardly inclined plane face, and draft-securing means on said plane face, of a device for deflecting matter from contact with the portion of the said plane face below the draft means, comprising a pair of diverging connected parts, one of said parts having its free end secured to said draft means and the other part of a length to underlie the body of the bait.

In witness whereof I have hereunto set my hand this 22nd day of August 1918.

WM. C. BROWN.

Witnesses:
 HOWARD P. DENISON,
 E. M. WILLIAMS.